INVENTOR
WILLIAM B. TOWLES
ATTORNEYS

INVENTOR
WILLIAM B. TOWLES
ATTORNEYS

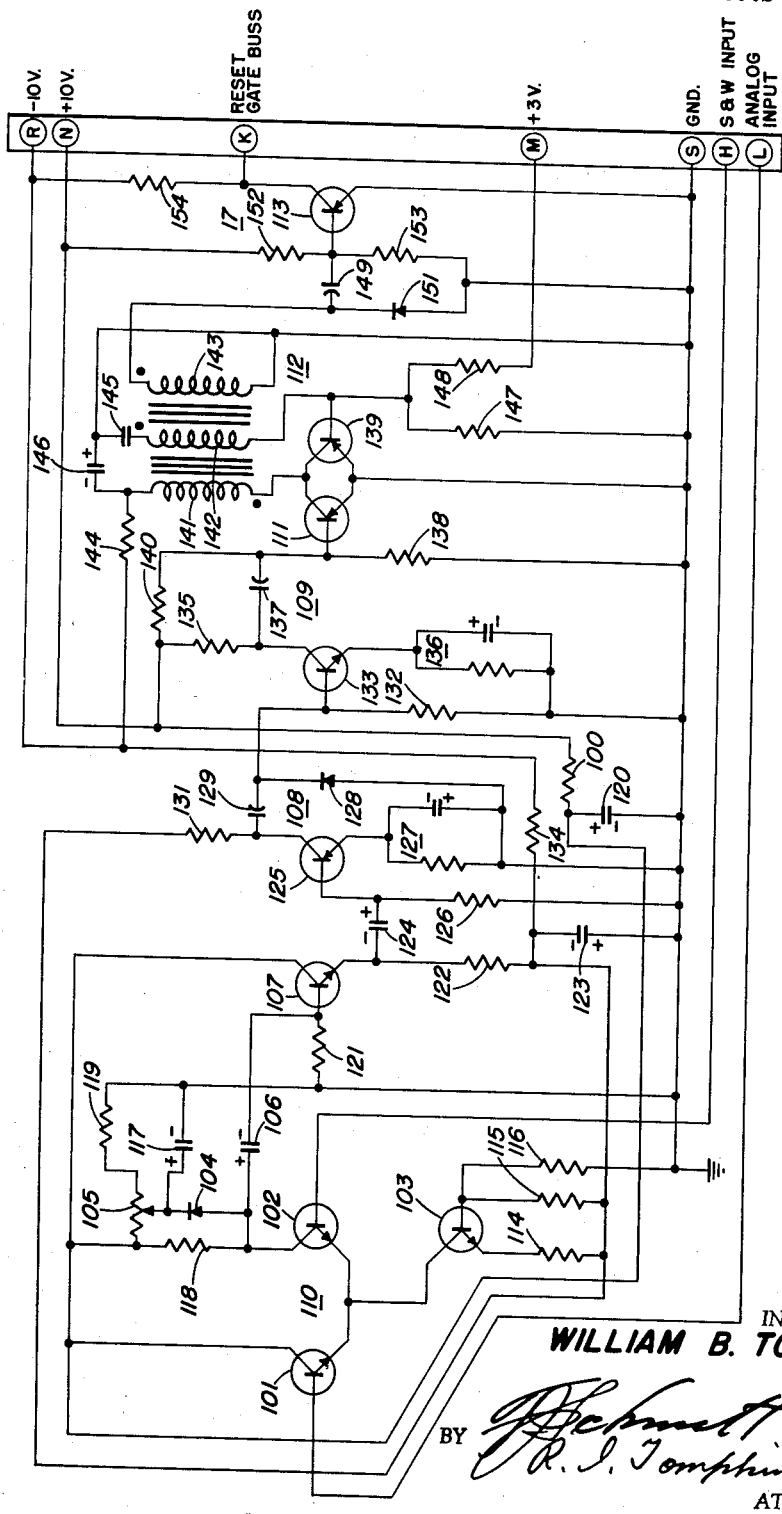

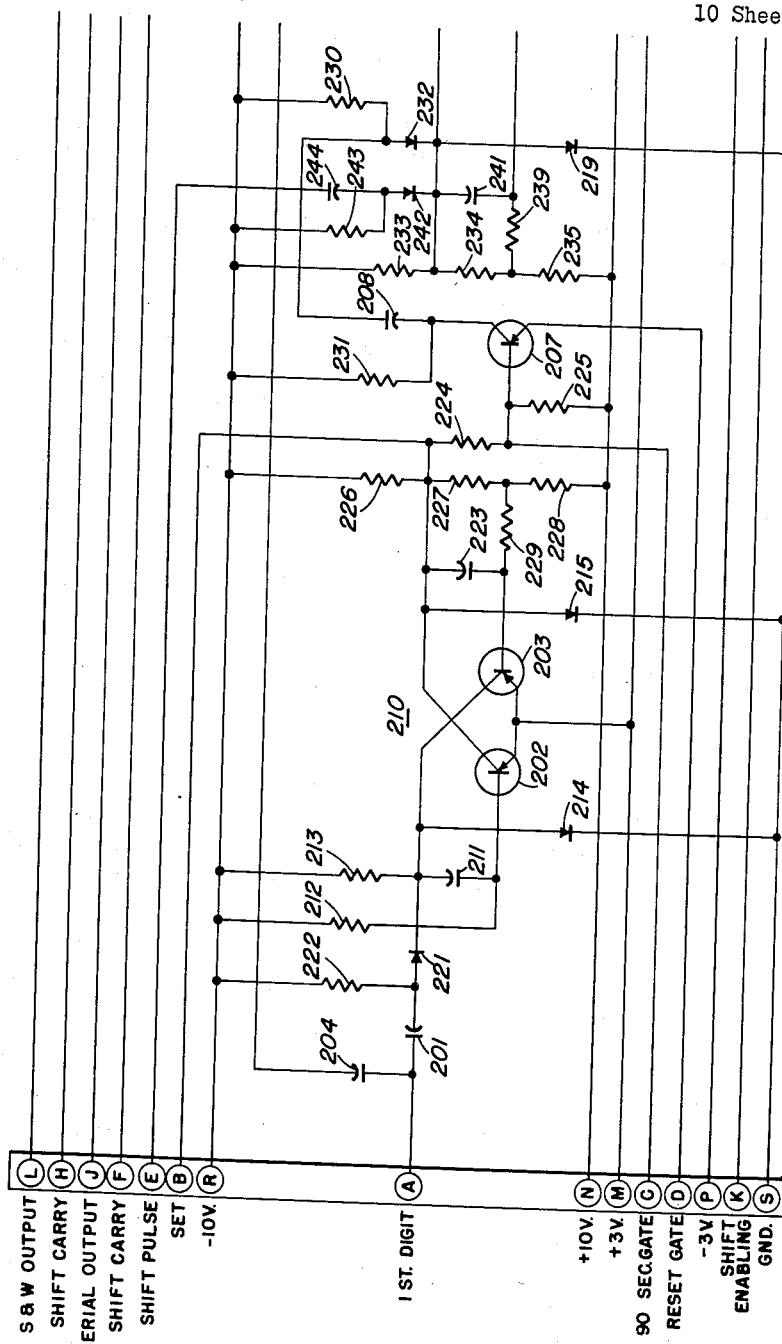

INVENTOR
WILLIAM B. TOWLES

INVENTOR
WILLIAM B. TOWLES

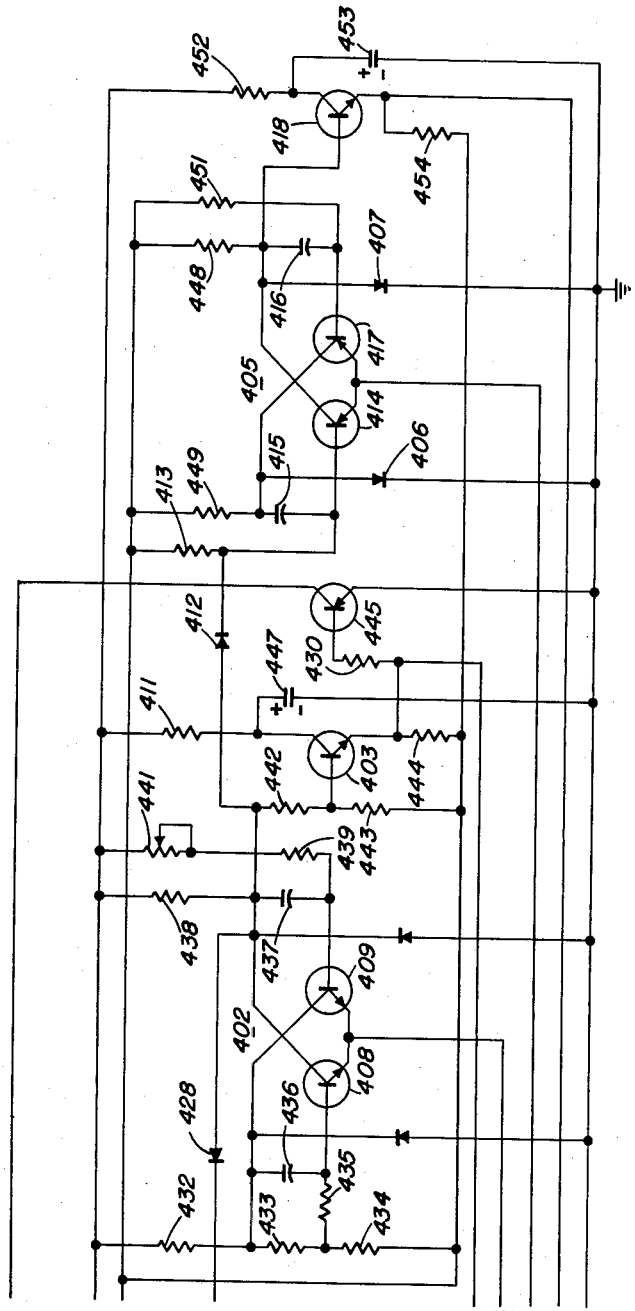

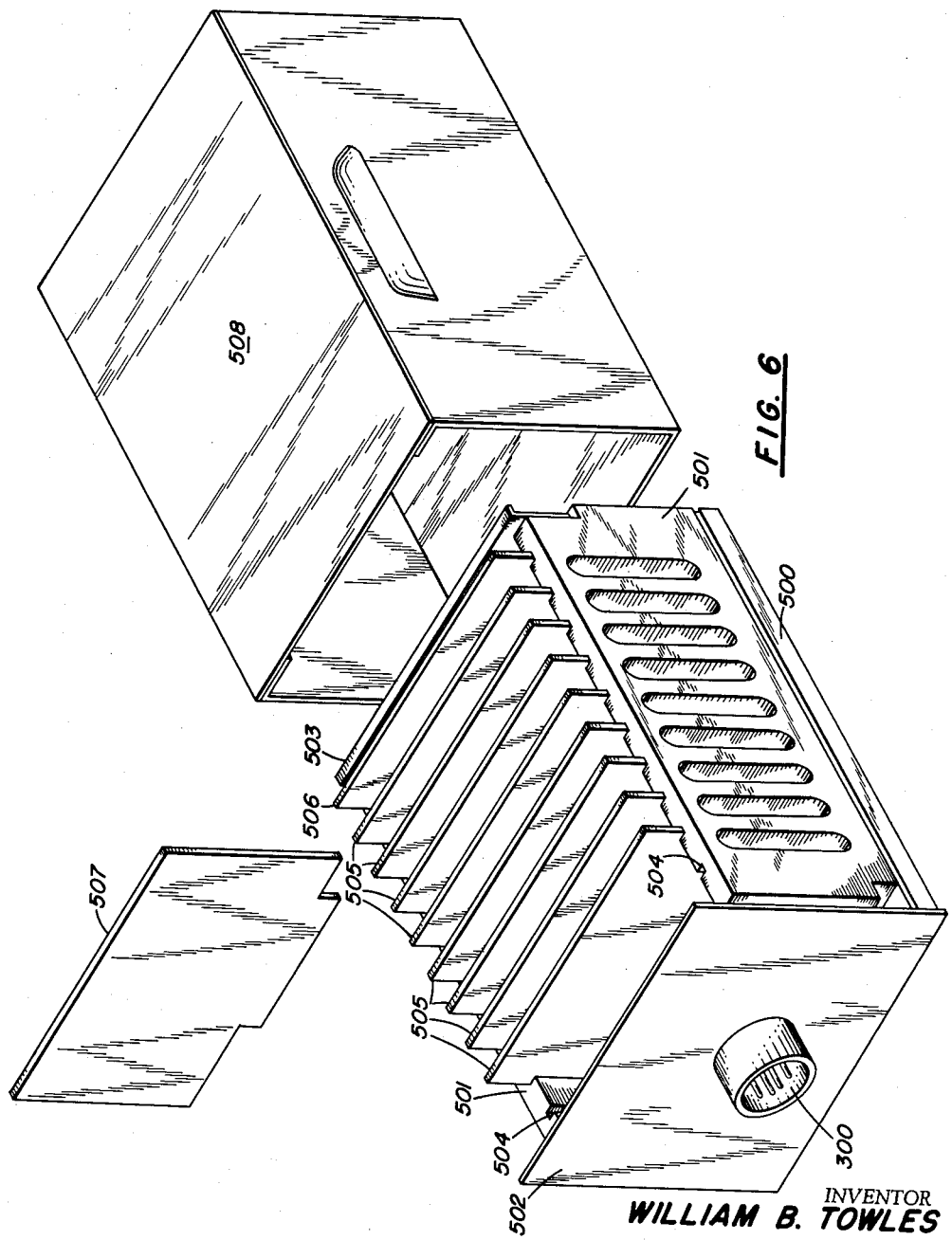

United States Patent Office
2,970,309
Patented Jan. 31, 1961

2,970,309
ANALOG-TO-DIGITAL CONVERTERS

William B. Towles, Timonium, Md., assignor, by mesne assignments, to the United States of America as represented by the Secretary of the Navy Filed Sept. 25, 1957, Ser. No. 686,269

6 Claims. (Cl. 340—347)

The present invention relates to analog-to-digital converters and more particularly to analog-to-digital converters of the successive approximation coding type and of compact structure.

An object of the present invention is the provision of an analog-to-digital conversion means which converts input voltages to binary digits.

Another object is to provide a transistorized analog-to-digital converter of compact construction.

Still another object is the provision of an analog-to-digital converter wherein bistable multivibrators indicate the significant digits in the shift register.

Other objects and many of the attendant advantages of this invention will be readily appreciated as the same becomes better understood by reference to the following detailed description when considered in connection with the accompanying drawings wherein:

Fig. 2 shows the schematic diagram of a comparator card used in the invention shown in Figs. 1a and 1b.

Figs. 3a and 3b show the schematic diagram of a "digit card."

Figs. 5a and 5b show the schematic diagram of a "shift card," and

Fig. 6 shows a pictorial view of the comparator card, the "digit cards" and the summing and weighting network assembled in a chassis.

Figure 1A:
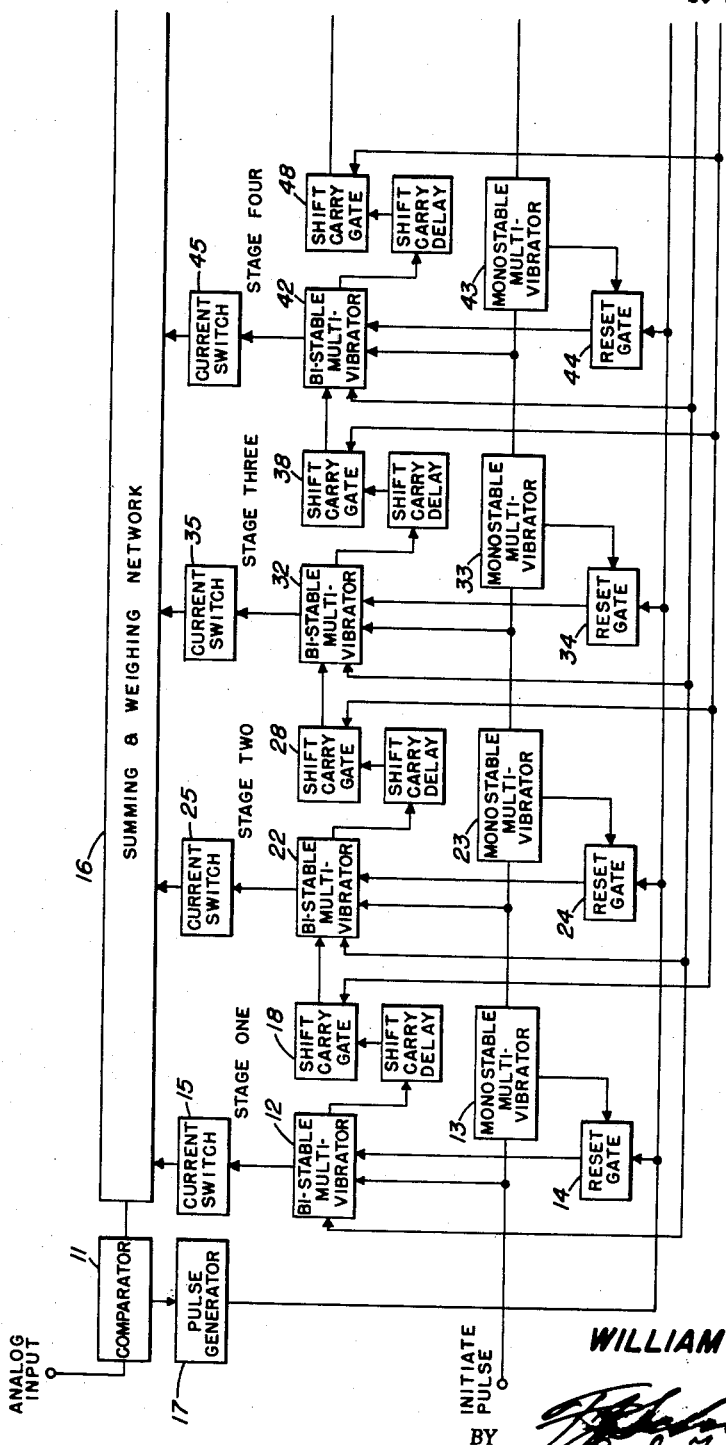
Figs. 1a and 1b show a block diagram of an embodiment of the invention.
Figure 1B:
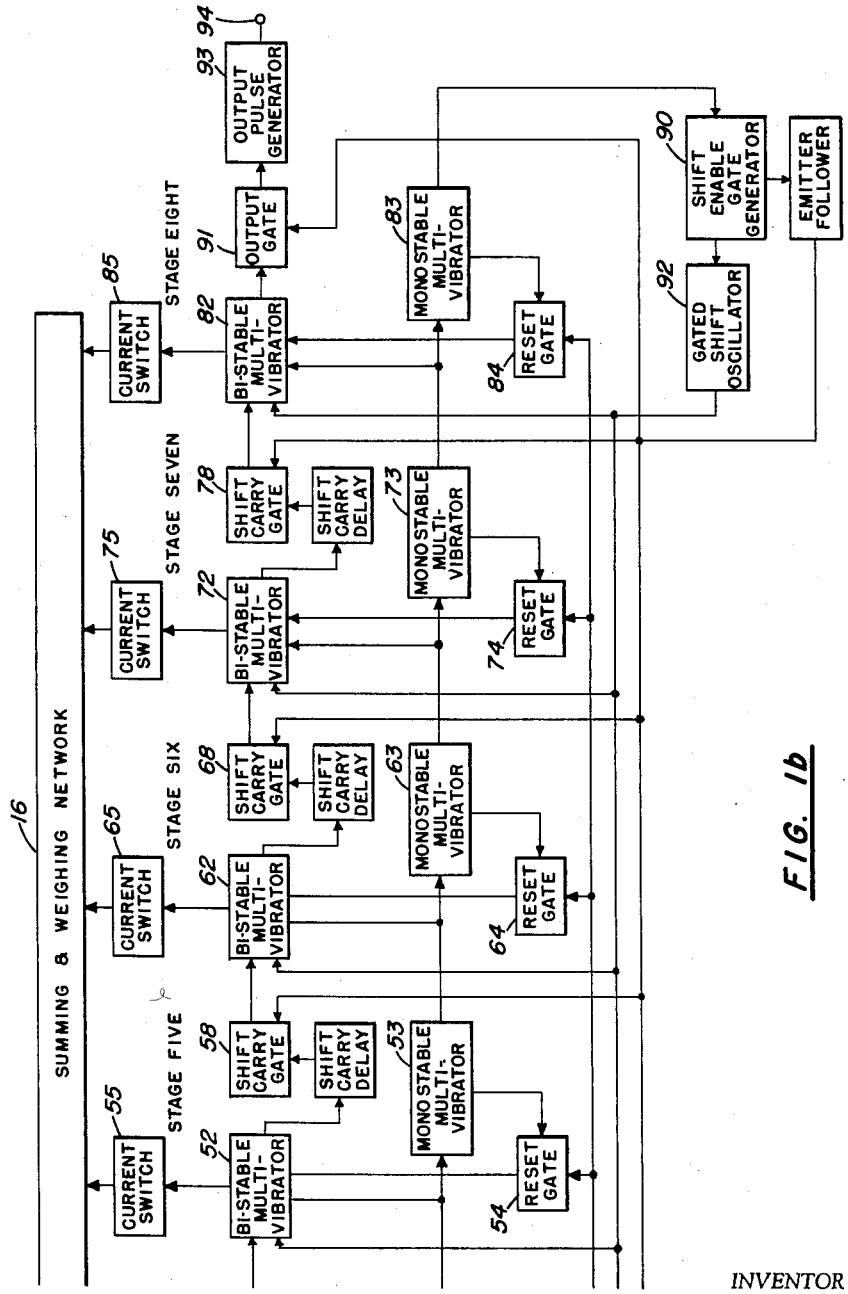

Referring now to the drawings, wherein like reference characters designate like or corresponding parts throughout the several views, there is shown in Figs. 1a and 1b a block diagram of a converter according to the invention. The method of coding used is that of successive approximation. An analog input voltage is applied to the comparator 11 as shown and an "initiate" pulse which may be supplied from any convenient source, as for example, a square wave generator is introduced to start the coding operation. This pulse sets bi-stable multivibrator 12, which represents the most significant digit in the shift register, to a "one" condition and triggers monostable multivibrator 13 that provides the dual function of producing a delay and generating an enabling pulse for reset gate 14.

When multivibrator 12 is set to a "one" condition, it turns on its associated current switch 15 which allows a precise value of direct current to flow into the summing and weighting network 16. This network weights the current according to the significance of the digit that it represents and presents a voltage to the comparator 11 proportional to this weighted current. Comparator 11 compares the voltage from network 16 with the analog input voltage, and then triggers a pulse generator 17 that sends a pulse to the reset gates 14, 24, 34, 44, 54, 64, 74 and 84. Since only reset gate 14 is enabled at this time, the pulse passes through this gate and resets multivibrator 12 to a "zero" condition. If the voltage from the network 16 is equal to or less than the analog input voltage, no reset pulse is generated and multivibrator 12 remains in the "one" condition.

A trigger pulse derived from the trailing edge of the pulse produced by multivibrator 13 is used to initiate a similar succession of events in stage two. However, now comparator 11 may receive a voltage from the summing and weighting network 16 proportional to the sum of the weighted currents of stages one and two, if stage one remained in a "one" condition. This total voltage is compared with the analog input voltage to determine whether stage two should be reset.

The same sequence is repeated for all stages proceeding from the most significant digit to the least significant digit. After the stage representing the least significant digit has been operated on, the binary number present in the register is the digital equivalent of the analog input voltage.

In order to obtain a serial output from the converter, it is necessary to shift out the digital number remaining in the shift register after the conversion is complete. The trailing edge of the pulse produced by monostable multivibrator 83 triggers the shift enable gate generator 90, which, in turn, enables the shift carry gates 18, 28, 38, 48, 58, 68, 78, the serial output gate 91, and gates on the gated shift oscillator 92. Shift pulses are then applied in parallel to all eight shift register bistable multivibrator stages in such a manner as to clear them (return to "zero" condition). Any bistable multivibrator previously in a "one" condition will trigger its associated shift delay circuit at the time of a shift pulse. At the end of the delay of approximately five microseconds, the following stage bistable multivibrator will be set to a "one" condition. If the same multivibrator were previously in a "zero" condition, then the following multivibrator would be left in the cleared or "zero" condition after the shift pulse. The shift enable gate generator 90 allows eight shift pulses to enter the shift register, at the end of which time all eight bistable multivibrators in the register are in the "cleared" or "zero" condition. The result of the shifting operation is that the condition of each bistable multivibrator is transmitted toward the output end of the shift register one digit at a time after each shift pulse. Since serial output gate 91 is held open by the shift enable gate generator 90, the output pulse generator 93 is triggered every time bistable multivibrator 82 changes from a "one" state to a "zero" state during the time that shift pulses are applied to the register. The presence of a pulse on the serial output line 94 at the time of a shift pulse indicates a "one" for a particular binary digit. The absence of an output pulse at the time of a shift pulse indicates a "zero." The digital number is shifted out of the shift register, least significant digit first. Since the bistable multivibrators are cleared during the shifting operation, the shift register is ready for the next coding cycle as soon as shifting is complete.

Referring now to Fig. 2, there is shown the schematic diagram of comparator 11. The first stage of the comparator is a differential amplifier 110 with transistors 101 and 102 connected in the common-emitter configuration. The total emitter current of transistors 101 and 102 is supplied by a constant current source consisting of transistor 103 and resistors 114, 115 and 116 in the common-base connection. The use of a source of constant emitter current for the differential amplifier assures freedom from common-mode effects at the output collector of the amplifier. Change in direct current level at the collector of transistor 102 would be quite appreciable since the analog input voltage covers a wide range of voltage, for example, zero to five volts. The collector voltage of transistor 102 is clamped by the clamping circuit consisting of clamping diode 104, capacitor 117, and resistors, 118 and 119 to a level established by the setting of potentiometer 105, which would be used during calibration. Collector voltage for transistors 101 and 102 is applied from terminal N through resistor 100 and across capacitor 120. When the amplitude of a pulse from the summing and weighting network 16 is applied to the base of transistor 102 through terminal H and exceeds the analog input voltage which is applied to the base of transistor 101 through terminal L, a negative pulse is coupled through capacitor 106 to the base of emitter follower 107. Resistor 121 is connected between the base of transistor 107 and ground. Resistor 122 is connected in series with capacitor 123 between the emitter of transistor 107 and ground. The emitter follower prevents the differential amplifier from being loaded excessively by succeeding circuitry. The emitter follower output is coupled through capacitor 124 and across resistor 126 to transistor amplifier stage 108. Amplifier 108 comprises a transistor 125 having a bias network 127, a diode 128 and a coupling capacitor 129 coupled between its emitter and base. The collector of transistor 125 is connected through resistors 131 and 134 to a negative voltage source at terminal R. The output of amplifier 108 is coupled through capacitor 129 and across resistor 132 to the base electrode of transistor 133 of amplifier 109. The collector of transistor 133 is connected through resistor 135 to terminal N, and the emitter is connected through a bias network 136 to ground.

A negative pulse is applied through capacitor 137 and across resistor 138 to the base of transistor 111, the triggering amplifier for blocking oscillator 112. Blocking oscillator 112 comprises a transistor 139, a blocking oscillator with windings 141, 142 and 143 having the polarity as indicated. The collecotr of transistor 139 is connected through winding 141 and resistor 144 to terminal R. The base electrode of transistor 139 is connected to terminal N through winding 142, capacitors 145 and 146 and resistor 144. The base of transistor 139 is also connected to ground through resistor 147 and to terimnal M through resistor 148. The base of transistor 111 is connected to terminal N through resistor 140.

The trailing edge of the blocking oscillator output pulse turns on the reset gate generator 17 which comprises transistor 113. The output of the oscilaltor 112 is coupled through capacitor 149 to the base of transistor 113. Blocking diode 151 is connected between the output of windnig 143 and ground. A potential divider, consisting of resistors 152 and 153 connected in series, is connected between terminal N and ground. The base of transistor 113 is connected to the common connection of resistors 152 and 153. The collector of transistor 113 is connected to terminal R through resistor 54 and the emitter is connected to ground.

Figure 3B:
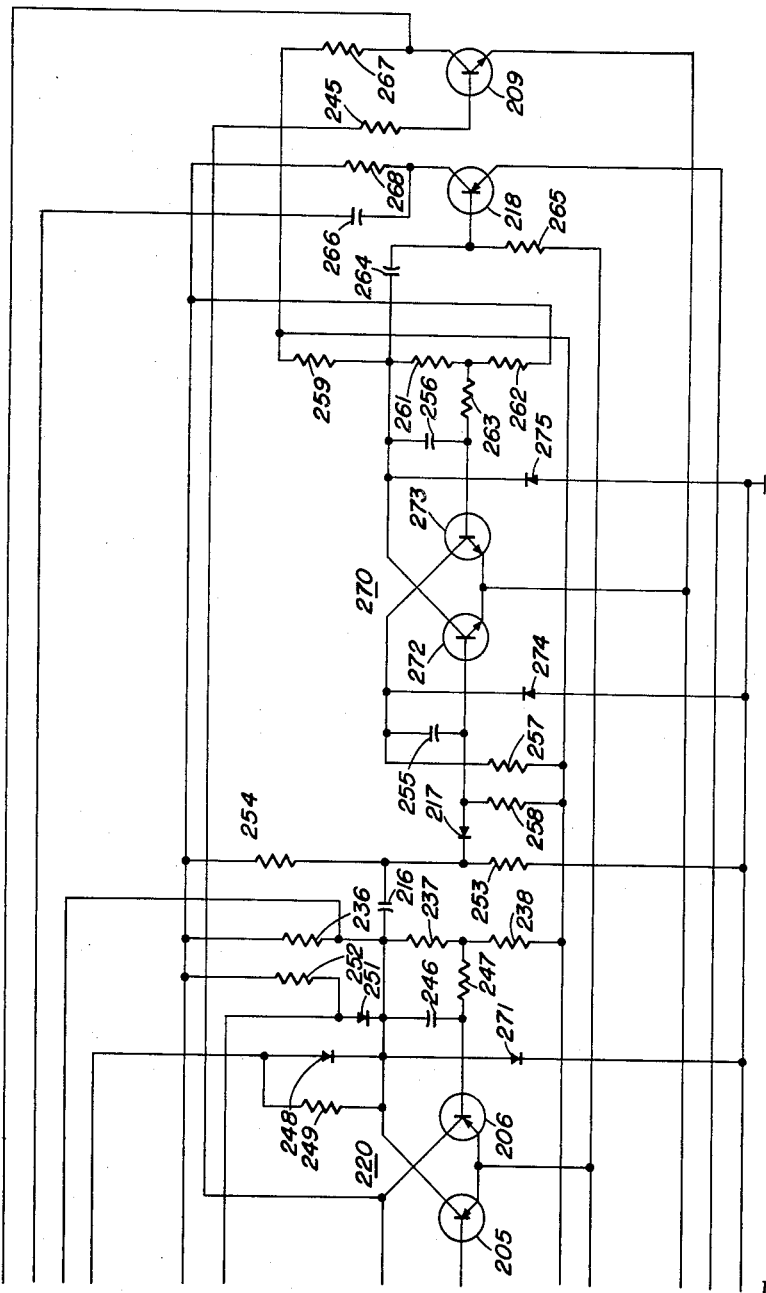

The schematic diagram for a "digit card" is shown in Figs. 3a and 3b. A positive "initiate" pulse, originat'ng outside the converter, is coupled through capacitor 201 and diode 221 to "set" the first monostable multivibrator 210 which comprises transistors 202 and 203. Resistor 222 is connected between the cathode of diode 221 and terminal R. The collector of transistor 202 is coupled to the base of transistor 207 across capacitor 223, through resistor 224 and across resistor 225. A potential divider consisting of resistors 226, 227 and 228 is connected between terminals N and R. Resistor 229 is connected between the base of transistor 203 and the common connection of resistors 227 and 228. The emitters of transistors 202 and 203 have a common connection to terminal M. The collector of transistor 207 is connected to terminal R through resistor 231 and is coupled to transistor 206 of multivibrator 220 through capacitor 208 and diode 232. Voltage dividers consisting of resistors 233, 234 and 235; and resistors 236, 237 and 238 are connected across terminals N and R. Resistor 239 is connected between the common connection of resistors 234 and 235 and the base of transistor 205.

Capacitor 241 is connected across the base of transistor 205 and the collector of transistor 206. The collector of transistor 206 is coupled to terminals R and E through diode 242 and resistor 243 and diode 232 and resistor 230 respectively. The collector is also connected to terminal E through diode 242 and capacitor 244. This collector is also connected to the base of diode 209 through resistor 245. Capacitor 246 is connected across the base of transistor 206 and the collector of transistor 205. Resistor 247 is connected between the common connection of resistors 237 and 238 and the base of transistor 206. The collector of transistor 205 is coupled to terminal F through diode 248 which is shunted by resistor 249. Resistor 252 is connected between the cathode of diode 251 and terminal R. The collector of transistor 205 is coupled to the base of transistor 272 through capacitor 216 and diode 217. Resistors 253 and 254 are series connected between terminal R and ground. Capacitor 255 is connected across the base of transistor 272 and the collector of transistor 273, and capacitor 256 is connected across the base of transistor 273 and the collector of transistor 272. The collector of transistor 273 is connected to terminal N through resistor 257. The base of transistor 272 is coupled to terminal N through resistor 258, to ground through diode 217 and resistor 253, and to terminal R through diode 217 and resistor 254. A voltage divider consisting of resistors 259, 261, and 262 is connected across terminals N and R. Resistor 263 is connected between the common connection of resistors 261 and 262 and the base of transistor 273. The collector of transistor 272 is coupled to the base of transistor 218 through capacitor 264 and the base of transistor 218 is connected to terminal M through resistor 265. The collector of transistor 218 is connected to terminal R through resistor 268 and has its output coupled to terminal H through capacitor 266. The collector of transistor 209 is connected to terimnal N through resistor 267 and the output is connected to terminal L. The initiate pulse is also coupled through capacitor 204 and diode 251 to set the first bistable multivibrator 220 which comprises transistors 205 and 206. When the monostable multivibrator 210 is "set" transistor 202 is turned on. In the nonconducting condition, the collector of transistor 202 becomes sufficiently negative to allow the emitter diode of the reset gate transistor 207 to be biased in the forward direction. This is equivalent to closing a switch in the reset gate circuit such that when a blocking oscillator pulse in the comparator turns on transistor 113 (Fig. 2), a positive pulse is coupled from transistor 207 through capacitor 208 which resets the first b:stable multivibrator 220 to its original condition. When the multivibrator 220 is in the "set" condition, transistor 206 is non-conducting and its collector voltage is negative (about eight volts). This serves to bias off transistor 209 and thus releases a clamping diode in the summing and weighting network 16, the output of which rises from zero to 2.5 volts.

The time constant of the multivibrator 210 is determined by the values of capacitor 211 and resistors 212 and 213. These are such as to produce a multivibrator gate width of 10 microseconds. The trailing edge of this pulse is applied as a "set" input to the monostable and bistable multivibrators on the second digit card, representing the next most significant digit If a reset pulse is then obtained from the comparator, the bistable multivibrator on the second digit card will be reset through reset gate 207, held open by monostable multivibrator 210 on the second digit card. Transistor 209 on the second card will then be cut off, and a second clamping diode will be released in the summing and weighting network, thus allowing its output to rise to 3.75 volts.

The collectors of transistors 202 and 203 are clamped to ground in the positive direction through diodes 214 and 215 to prevent saturation with the consequent turnoff delays caused by minority-carrier storage. Transistors 205, 206, 272 and 273 are prevented from saturating in the same manner by means of diodes 219, 271, 274 and 275 respectively. "Hard" clamps of this type have the advantage over "soft" clamps of allowing collector voltage waveforms to be produced with well-defined direct current levels even when transistors with widely-varying current gains are used in the multivibrators. The disadvantages of allowing multivibrators to saturate are the increased transition time incurred and the wider trigger pulses required. When a trigger pulse is applied to a saturated transistor with such a polarity as to back-bias its base-emitter diode, the input pulse must be at least as long as the sum of the storage time and the switching time from the "on" to the "off" state. The storage time can be as long as several microseconds, particularly if a transistor is driven deep into saturation by virtue of an unusually high current gain and a large, forward base current.

When the multivibrator 220 is reset, it triggers the shift delay monostable multivibrator 270 with a negative pulse through coupling capacitor 216 and diode 217. A pulse derived from this multivibrator is applied to the shift carry gate, transistor 218. If the shift enabling gate transistor 310 on the shift card is in a conducting state at this time, a positive shift carry pulse is applied to the bistable multivibrator on the next digit card. The shifting operation will be described later.

Figure 4A:
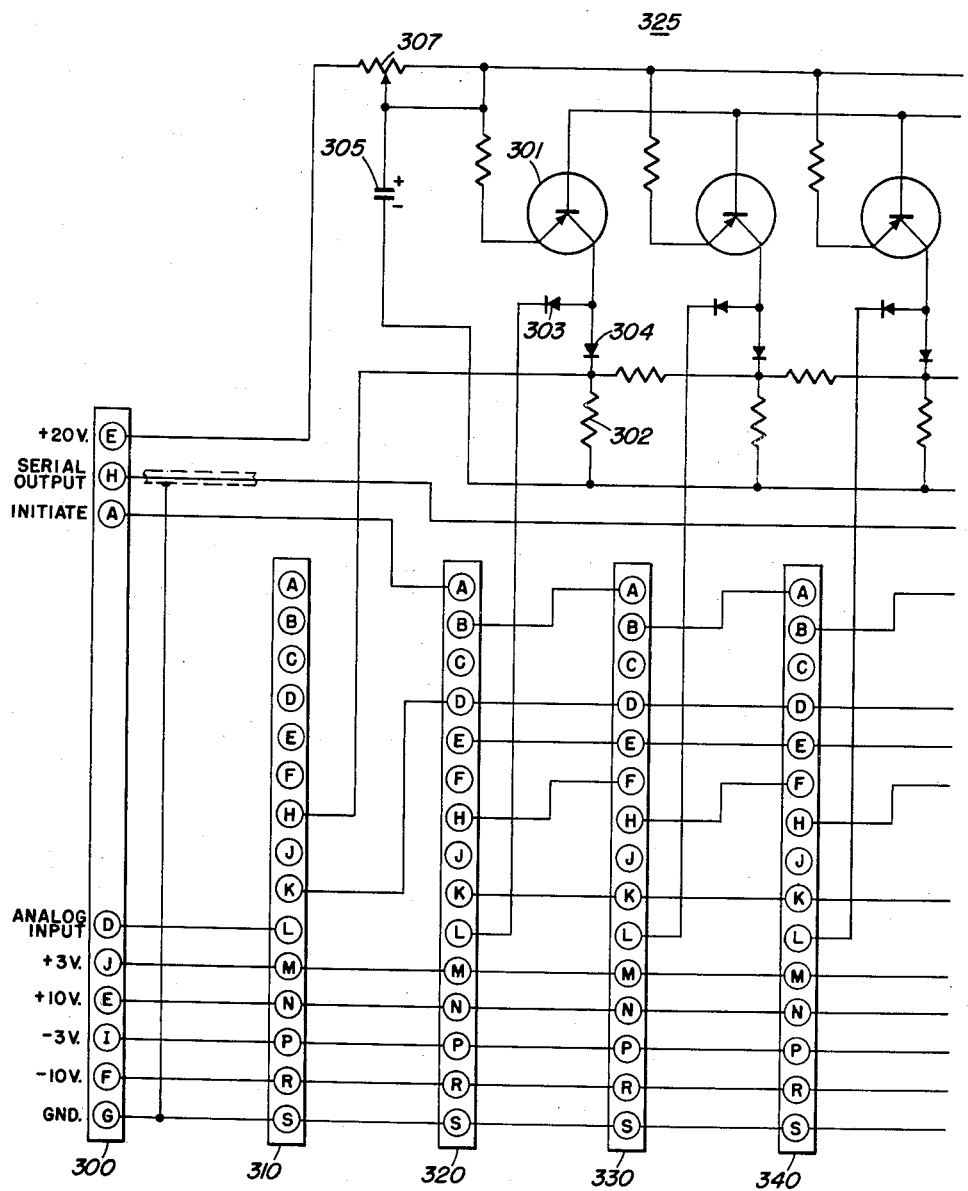
Figs. 4a and 4b show the schematic diagram of the summing and weighting network.
Figure 4B:
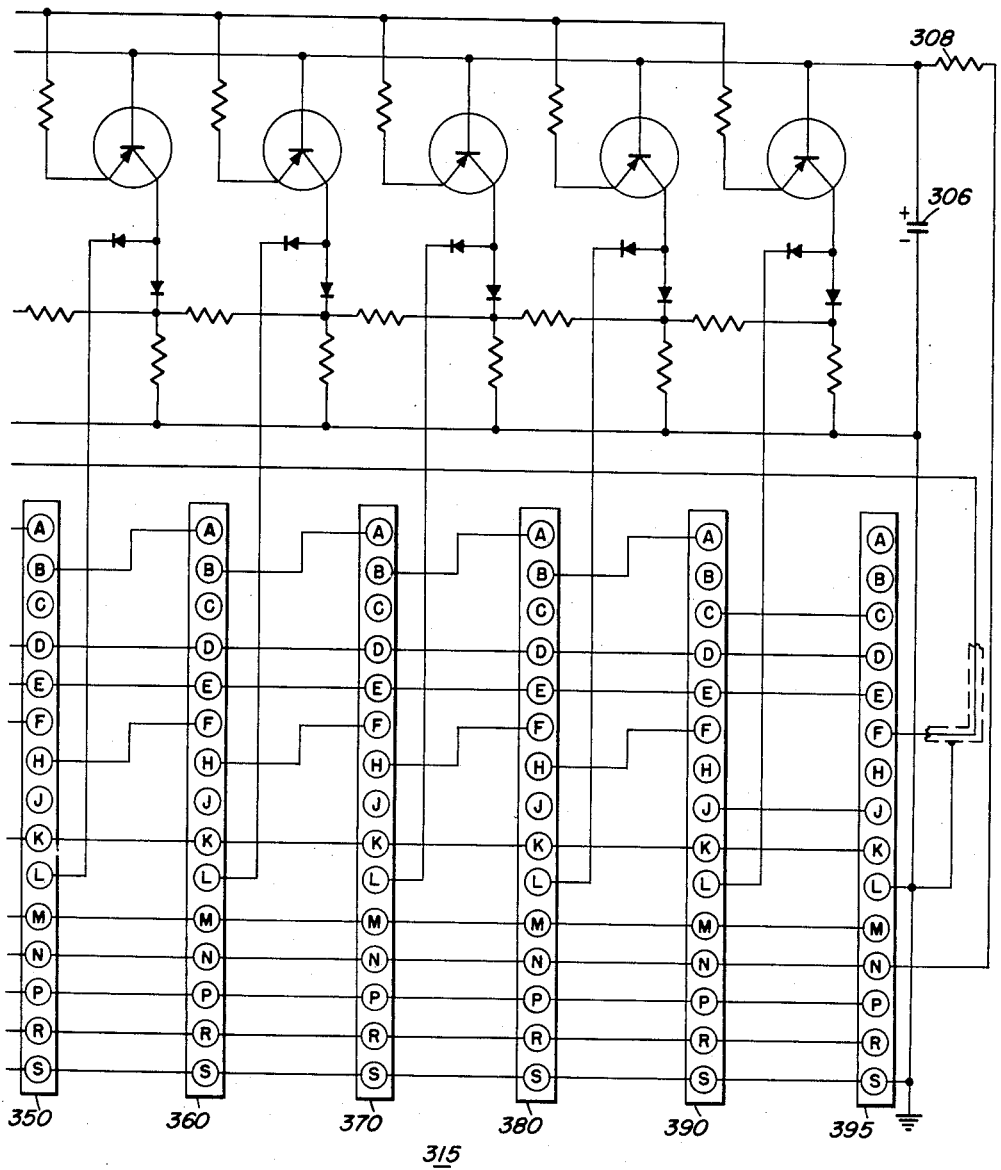

The diagram of Figure 4 shows the schematic diagram of the base card 315 and the summing and weighting network 325. Base card has plug bars 310, 320, 330, 340, 350, 360, 370, 380, 390 and 395. Plug bar 310 receives the terminals of the comparator circuit and plug bars 320, 330, 340, 350, 360, 370, 380 and 390 receive the terminals of the eight digit cards. Plug bar 395 receives the terminals of the shift card which will be described later. Reference numerals will not be applied to the circuit elements for digit cards two through eight except where necessary to show the co-operation of the different circuits. When the first bistable multivibrator 220 (Fig. 3) is set to "one" condition by the "initiate" pulse, its associated current switch 209 allows a precise value of direct current from a constant-current source transistor 301 to flow into the first node of the resistive ladder network through terminal L of plug bar 320. The value of the current is such as to produce a voltage step at the summing and weighting network output at terminal H of plug bar 310 of exactly 2.5 volts, half of the maximum analog input voltage of five volts. If the analog input voltage is larger than 2.5 volts, the bistable multivibrator 220 is not reset and the bistable multivibrator on the second digit card is triggered to a "one" condition. A direct current is now allowed to flow into the second node of the resistive ladder network and half of this current is added to that already flowing into the first node, thus developing 3.75 volts across resistor 302 at the output of the summing and weighting network. The process is repeated for the third digit card and the added current into resistor 302 is one fourth of the current injected into the third node of the ladder network.

Transistors in the common-base configuration are used to supply constant currents for the summing and weighting network. The currents can be held constant to better than 0.1%, and the large power loss of a high-voltage, high-resistance, constant-current source is avoided with this method.

When the bistable multivibrator 220 on the first digit card is in the "zero" or reset condition, transistor 209, in Fig. 3, is saturated and its collector is practically at the emitter potential of minus three volts. Silicon diode 303 in the summing and weighting network is then forward biased and the collector of the constant current transistor 301 is at a potential of about −2.5 volts. Since silicon diode 304 is reverse-biased under this condition, all of the constant collector current from transistor 301 passes through diode 303. If the bistable multivibrator 220 is now set to a "one" condition transistor 209, on the first digit card, will be cut off and the cathode of diode 303 will rise to 10 volts, reverse-biasing the diode. Under this condition, the constant collector current of transistor 301 flows through diode 304 and develops 2.5 volts across the summing and weighting network, as previously explained. The process continues in a similar fashion for the remaining seven digits. Silicon point-contact diodes are used in the summing and weighting network because of their combined high back resistance and low shunt capacitance. It is important that unwanted transients be prevented from coupling through the reverse biased diodes to the ladder network. Capacitors 305 and 306 and resistors 307 and 308 form heavy decoupling networks to prevent supply voltage transients from reaching the summing and weighting network. Potentiometer 307 is used to provide a fine adjustment on the emitter current of transistor 301 for calibration purposes.

Figure 5A:
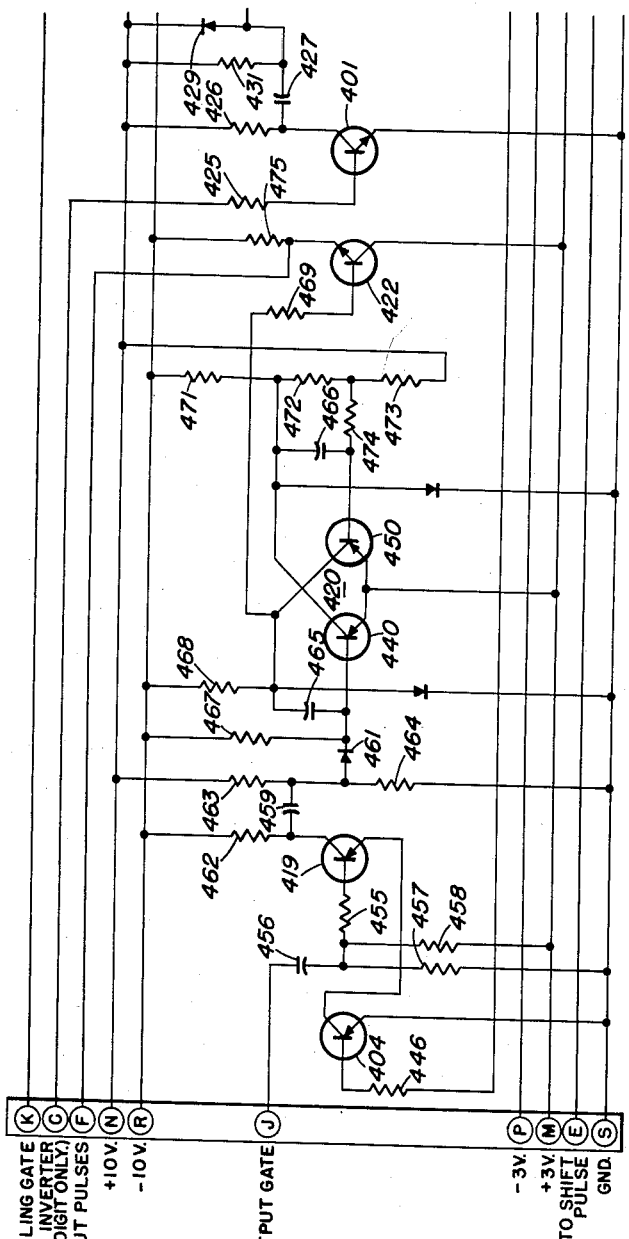

The shift card schematic diagram is shown in Figs. 5a and 5b. A pulse derived from the trailing edge of the output pulse of the monostable multivibrator 210 on the eighth digit card is coupled through resistor 425 to the base of inverter amplifier transistor 401. The collector of transistor 401 is connected to terminal N through resistor 426 and the emitter is connected to ground. The collector is coupled through capacitor 427 and diode 428 to the collector of transistor 408. Diode 429 having a shunt resistor 431 is connected between capacitor 427 and terminal N. A voltage divider consisting of resistors 432, 433 and 434 connected in series is connected across terminals R and N. Resistor 435 is connected between the common connection of resistors 433 and 434 and the base of transistor 408. Capacitor 436 is connected across the base of transistor 408 and the collector of transistor 409, and capacitor 437 is connected across the base of transistor 409 and the collector of transistor 408. The collector of transistor 408 is connected to terminal N through resistor 438 and the base of transistor 409 is connected to terminal N through fixed resistor 439 and variable resistor 441. The collector of transistor 408 is connected to the base of transistor 403 through resistor 442 and to the base of transistor 414 through diode 412. The base of transistor 403 is connected to terminal R through resistor 443. The emitter is connected to terminal R through resistor 444, to the base of transistor 430 through resistor 445 and to the base of transistor 404 through resistor 446. The collector of transistor 430 is connected to terminal K. The collector of transistor 403 is coupled to ground through capacitor 447.

The collector of transistor 414 is coupled to the base of transistor 418 and to terminal R through resistor 448. The collector of transistor 417 is connected to terminal R through resistor 449 and the base is connected to the same terminal through resistor 451. The collector of transistor 418 is connected to terminal N through resistor 452 and coupled to ground through capacitor 453. The collector of transistor 418 is connected to R through resistor 454 and to terminal E.

The collector of transistor 404 is coupled to the emitter of transistor 419 and the emitter is connected to ground. The base of transistor 419 is coupled through resistor 455 and capacitor 456 to terminal J. Resistors 457 and 458 are connected respectively between the common connection of capacitor 456 and resistor 455, ground, and terminal M. The collector of transistor 419 is coupled to the base of tube 440 through capacitor 459 and diode 461. The collector is also connected to terminal R through resistor 462. Resistors 463 and 464 are connected in series across terminal N and ground to form a voltage divider. Capacitor 465 is connected across the base of transistor 440 and the collector of transistor 450 while capacitor 466 is connected across the base of transistor 450 and the collector of transistor 440. The collector of transistor 450 is connected to terminal R through resistor 468 and to the base of transistor 422 through resistor 469. Resistors 471, 472, and 473 are connected across terminals R and N to form a voltage divider. The base of transistor 450 is connected to the common connection of resistors 472 and 473 through resistor 474. The collector of transistor 422 is connected to terminal R through resistor 475 and to terminal F.

The operation of the shift card is as follows: A pulse derived from the trailing edge of the output pulse of the monostable multivibrator 210 on the eighth digit card is inverted in amplifier stage 401 on the shift card. The negative trigger pulse obtained is used to "set" the 90-microsecond monostable multivibrator gate generator 402 on the shift card. A 90-microsecond negative gating waveform is applied through emitter follower 403 to enable the serial output gate 404 on the shift card and the shift carry gates 218 on the digit cards. The 90-microsecond gating pulse is also used to gate on the 100 kc. shift oscillator 405, an asymmetrical, free-running multivibrator, with two-microsecond output pulses occurring every 10 microseconds. Multivibrator 405 is kept from saturating by diodes 406 and 407. When the 90-microsecond gate generator 402 is in the "reset" condition, transistor 408 is cut off and current through resistor 438, diode 412 and resistor 413 holds the base of transistor 414 in the shift oscillator at about nine volts. Since its emitter is returned to the three-volt supply, transmitter 414 is held in the cutoff condition. When multivibrator 402 is triggered, however, the anode potential of diode 412 falls to ground level and the diode is reverse-biased. This allows the base voltage of transistor 414 to drop exponentially toward −10 volts as capacitor 415 charges through resistor 413. When the base level of transistor 414 falls below three volts, the transistor starts conducting and its rising collector voltage waveform is coupled through capacitor 416 to turn off transistor 417. Oscillation continues until the 90-microsecond gate pulse is terminated, at which time the base voltage of transistor 414 is increased to and held at nine volts, thus terminating the shift pulses. The asymmetrical collector waveforms of the shift multivibrator oscillator 405 are the result of unequal values of collector-to-base capacity. The positive shift pulses are applied to the bistable multivibrators on all eight digit cards in parallel through emitter follower 418.

During the shift operation a "one" in the bistable multivibrator 220 on the eighth digit card produces a negative pulse at the base of transistor 419 in the serial output gate. Since transistor 404 in this gate is already in a conducting state because of the negative 90-microsecond gate pulse from transistor 403, a positive pulse is produced at the collector of transistor 419 that triggers the output monostable multivibrator pulse generator 420. The positive multivibrator pulses are fed into an emitter follower, 322, that delivers 10-volt, 5-microsecond pulses from a source impedance of less than 200 ohms into the serial output line.

Fig. 6 shows the mechanical assembly of the several circuits. The structure consists of a base 500 with sides 501 and end plates 502 and 503 attached. The side pieces 501 have ten pairs of slots 504 for the plug-in cards. The chassis is constructed of light weight material as for example, aluminum. There are eight identical "digit" cards 505, one "shift" card 506, one "comparator" card 507 (shown removed), and one "base" card in the base of the chassis, not shown. The base card contains the summing and weighting network as well as the ten base plugs with printed circuit interconnections, and it is attached directly to the base frame of the chassis. Appropriate base plugs are offset to make accidental insertion of a card in the wrong slot impossible. The eight "digit" cards are identical and interchangeable. The frame assembly slides into a dust cover 508.

The overall dimensions of the converter are as follows: 4 1/16 inches high; 5 29/32 inches wide; and 7 1/2 inches deep. The overall sive is 160.8 cubic inches and the complete weight of the converter is 3 pounds and 10 ounces.

The values used in described this invention are by way of example only and are not intended to restrict the scope of the invention.

Obviously many modifications and variations of the present invention are possible in the light of the above teachings. It is therefore to be understood that within the scope of the appended claims the invention may be practiced otherwise than as specifically described.

What is claimed is:

1. An analog-to-digital converter comprising: a shift register having an input stage an intermediate stage and an output stage; said input stage having four inputs and three outputs, said input stage comprising a bistable multivibrator having three inputs and two outputs, a monostable multivibrator having an input and two outputs, a current switch having an input and an output, a reset gate having two inputs and an output, a shift carry gate having two inputs and an output, and a shift carry delay circuit having an input and an output; said bistable multivibrator having a first input coupled to a first of the four inputs of said input stage, a second input coupled to a second of the four inputs of said input stage, and a third input coupled to the output of said rest gate, one of said bistable multivibrator outputs being coupled to the input of said current switch and the other output being coupled to the input of said shift carry delay circuit, the output of the shift carry delay circuit being coupled to one of the inputs of said shift carry gate, the other of said shift carry gate inputs being coupled to the fourth of said four inputs of said input stage, the output of said shift carry gate being coupled to the first of said three outputs of said input stage, said reset gate having one of its inputs coupled to a third of the four inputs of said input stage, the other input of said reset gate being coupled to one of the outputs of said monostable multivibrator, the input of said monostable multivibrator being coupled to said first of the four inputs of said input stage and the other output of said monostable multivibrator being coupled to a second of the three outputs of said input stage, the output of said current switch being coupled to the third of said input stage outputs; said intermediate stage having five inputs and three outputs, said intermediate stage comprising a bistable multivibrator having four inputs and two outputs, a monostable multivibrator having an input and two outputs, a current switch having an input and an output, a reset gate having two inputs and an output, a shift carry gate having two inputs and an output, and a shift carry delay circuit having an input and an output; said bistable multivibrator having a first input coupled to a first of the five inputs of said intermediate stage, a second input coupled to a second of the five inputs of said intermediate input stage, a third input coupled to the output of said reset gate and a fourth input coupled to the fifth input of said intermediate stage, one of said bistable multivibrator outputs being coupled to the input of said current switch and the other output being coupled to the input of said shift carry delay circuit, the output of the shift carry delay circuit being coupled to one of the inputs of said shift carry gate, the other of said shift carry gate inputs being coupled to a fourth of said five inputs of said intermediate stage, the output of said shift carry gate being coupled to the first of said three outputs of said intermediate stage, said reset gate having one of its inputs coupled to a third of the five inputs of said intermediate stage, the other input of said reset gate being coupled to one of the outputs of said monostable multivibrator, the input of said monostable multivibrator being coupled to said first of the five inputs of said intermediate stage and the other output of said monostable multivibrator being coupled to a second of the three outputs of said intermediate stage, the output of said current switch being coupled to the third of said intermediate stage outputs; said output stage having four inputs and three outputs, a reset gate having two inputs and an output, a monostable multivibrator having one input and two outputs, a bistable multivibrator having four inputs and two outputs, and a current switch having an input and an output; a first of said bistable multivibrator inputs being coupled to a first of said output stage inputs, a second of said bistable multivibrator inputs being coupled to a second of said output stage inputs, a third of said bistable inputs being coupled to the fourth of said output stage inputs, said reset gate having one of its inputs coupled to a third of said output stage inputs, the output of said reset gate being coupled to the fourth input of said bistable multivibrator, said monostable multivibrator having an input coupled to the fourth input of said output stage inputs, one of the outputs of said monostable multivibrator being coupled to the other input of said reset gate, the other output of said monostable multivibrator being coupled to a first output of said output stage, one of said bistable multivibrator outputs being coupled to the input of said current switch, the other output of said bistable multivibrator being coupled to a second of said output stage outputs, the output of said current switch being coupled to the third output of said output stage; a summing and weighting network having an output and at least a first second and third input coupled respectively to the third output of said input stage, said intermediate stage and said output stage; a comparator circuit having two inputs and an output, one of said comparator inputs having an analog voltage applied thereto and the other of said inputs being coupled to the output of said summing and weighting network, the output of said comparator circuit being coupled to said third inputs of said input, intermediate and output stages; a shift circuit having two inputs and three outputs, said shift circuit comprising an output gate having two inputs and one output, an output pulse generator having an input and an output, a shift enable gate generator having an input and two outputs, and a gated shift oscillator having an input and an output; one of the inputs of said output gate being coupled to one of the impulse of said shift circuit, the output of said output gate being coupled to the input of said output pulse generator, the input of said shift enable gate generator being coupled to the other input of said shift circuit, one of said shift enable gate generator outputs being coupled to the input of said gated shift oscillator, the other output of said shift enable gate generator outputs being coupled to the input of said gated shift oscillator, the other output of said shift enable gate generator being coupled to a second of said shift circuit inputs, the output of said gated shift oscillator being coupled to a first of said shift circuit inputs; circuit means respectively coupling the first and second outputs of said input stage to the fifth and first inputs of said intermediate stage, circuit means respectively coupling the first and second outputs of said intermediate stage to the first and fourth inputs of said output stage, circuit means respectively coupling the first and second outputs of said output stage to the second and first inputs of said shift circuit, circuit means coupling the first output of said shift circuit to the second inputs of said stages, circuit means coupling the second output of said shift circuit to the fourth inputs of said input stage and said intermediate stage; means coupling an initiate pulse generating means to the first input of said input stage, whereby an output signal will be obtained at the output terminal of said output pulse generator which is the binary equivalent of said analog voltage.

2. The combination of claim 1 wherein said input stage comprises a circuit having four inputs and three outputs, said circuit comprising a first and second transistor each having a base, a collector and an emitter, a first coupling capacitor connected between the base of said first transistor and the collector of said second transistor, a second coupling capacitor connected between the base of said second transistor and the collector of said first transistor, the emitters of said first and second transistors being connected to a first positive voltage supply through a common connection, the base of said first transistor being coupled to a first negative voltage supply, the collector of said second transistor being coupled to the anode of a diode and said first negative voltage supply, said diode having a cathode coupled through a resistor to said first negative voltage supply and being coupled to a first of said four inputs through a third coupling capacitor, the collectors of said first and second transistors being respectively coupled to ground through first and second clamping diodes, the collector of said first transistor being coupled to a first of said three outputs and to said first negative voltage supply, first, second, third and fourth voltage dividers connected between said first negative voltage supply and said second positive voltage supply, the base of said second transistor being coupled to a tap on said first voltage divider, a third transistor having a base, collector, and an emitter, the base of said third transistor being coupled to the collector of said second transistor and to a second positive voltage supply, the emitter of said third transistor being coupled to a third of said four inputs, the collector of said third transistor being coupled to said first negative voltage supply, fourth and fifth transistor each having a base, collector, and emitter, a fourth coupling capacitor connected between the base of said fourth transistor and the collector of said fifth transistor, a fifth coupling capacitor connected between the base of said fifth transistor and the collector of said fourth transistor, the emitters of said fourth and fifth transistors being coupled through a common connection to said first positive voltage supply, the base of said fourth transistor being coupled to a first tap on said second voltage divider, the collector of said fifth transistor being coupled to a second tap on said second voltage divider and to said second input, the collector of said fifth transistor being coupled to said second input, third and fourth clamping diodes respectively coupling the collectors of said fourth and fifth transistors to ground, the collector of said fourth transistor being coupled to said first input, sixth and seventh transistors each having a base, collector and an emitter, a sixth coupling capacitor connected between the base of said sixth transistor and the collector of said seventh transistor, a seventh coupling capacitor connected between the base of said seventh transistor and the collector of said sixth transistor, the emitters of said sixth and seventh transistors being coupled through a common connection to said second negative voltage supply, fifth and sixth clamping diodes respectively coupling the collectors of said sixth and seventh transistors to ground, the base of said sixth transistor being coupled to the collector of said fourth transistor, the collector of said seventh transistor being coupled to said second positive voltage supply, the base of said seventh transistor being coupled to a tap on said fourth voltage divider, an eighth transistor having a base, collector and an emitter, the base of said eighth transistor being coupled to the collector of said sixth transistor and to said first positive voltage supply, the collector of said eighth transistor being coupled through a resistor to said first negative voltage supply and through a capacitor to said second output, the emitter of said eighth transistor being coupled to said fourth input, a ninth transistor having a base, collector and an emitter, the base of said ninth transistor being coupled through a resistor to the collector of said fifth transistor, the emitter of said ninth transistor being coupled to said second negative voltage supply, and the collector of said ninth transistor being coupled through a resistor to said second positive voltage supply and directly coupled to said third output.

3. The combination of claim 2 wherein said intermediate stage comprises a circuit having five inputs and three outputs, said circuit comprising a first and second transistor each having a base, a collector and an emitter, a first coupling capacitor connected between the base of said first transistor and the collector of said second transistor, a second coupling capacitor connected between the base of said second transistor and the collector of said first transistor, the emitters of said first and second transistors being connected to a first positive voltage supply through a common connection, the base of said first transistor being coupled to a first negative voltage supply, the collector of said second transistor being coupled to the anode of a diode and said first negative voltage supply, said diode having a cathode coupled through a resistor to said first negative voltage supply and being coupled to a first of said five inputs through a third coupling capacitor, the collectors of said first and second transistors being respectively coupled to ground through first and second clamping diodes, the collector of said first transistor being coupled to a first of said three outputs and to said first negative voltage supply, first, second, third and fourth voltage dividers connected between said first negative voltage supply and said second positive voltage supply, the base of said second transistor being coupled to a tap on said first voltage divider, a third transistor having a base, collector, and an emitter, the base of said third transistor being coupled to the collector of said second transistor and to a second positive voltage supply, the emitter of said third transistor being coupled to a third of said five inputs, the collector of said third transistor being coupled to said first negative voltage supply, fourth and fifth transistors each having a base, collector, and emitter, a fourth coupling capacitor connected between the base of said fourth transistor and the collector of said fifth transistor, a fifth coupling capacitor connected between the base of said fifth transistor and the collector of said fourth transistor, the emitters of said fourth and fifth transistors being coupled through a common connection to said first positive voltage supply, the base of said fourth transistor being coupled to a first tap on said second voltage divider, the collector of said fifth transistor being coupled to a second tap on said second voltage divider and to said second input, the collector of said fifth transistor being coupled to said second input, third and fourth clamping diodes respectively coupling the collectors of said fourth and fifth transistors to ground, the collector of said fourth transistor being coupled to said first and fifth inputs, sixth and seventh transistors each having a base, collector and an emitter, a sixth coupling capacitor connected between the base of said sixth transistor and the collector of said seventh transistor, a seventh coupling capacitor connected between the base of said seventh transistor and the collector of said sixth transistor, the emitters of said sixth and seventh transistors being coupled through a common connection to said second negative voltage supply, fifth and sixth clamping diodes respectively coupling the collectors of said sixth and seventh transistors to ground, the base of said sixth transistor being coupled to the collector of said fourth transistor, the collector of said seventh transistor being coupled to said second positive voltage supply, the base of said seventh transistor being coupled to a tap on said fourth voltage divider, an eighth transistor having a base, collector and an emitter, the base of said eighth transistor being coupled to the collector of said sixth transistor and to said first positive voltage supply, the collector of said eighth transistor being coupled through a resistor to said first negative voltage supply and through a capacitor to said second output, the emitter of said eighth transistor being coupled to said fourth input, a ninth transistor having a base, collector and an emitter, the base of said ninth transistor being coupled through a resistor to the collector of said fifth transistor, the emitter of said ninth transistor being coupled to said second negative voltage supply, and the collector of said ninth transistor being coupled through a resistor to said second positive voltage supply and directly coupled to said third output.

4. The combination of claim 3 wherein said output stage comprises a circuit having four inputs and three outputs, said circuit comprising a first and second transistor each having a base, a collector and an emitter, a first coupling capacitor connected between the base of said first transistor and the collector of said second transistor, a second coupling capacitor connected between the base of said second transistor and the collector of said first transistor, the emitters of said first and second transistors being connected to a first positive voltage supply through a common connection, the base of said first transistor being coupled to a first negative voltage supply, the collector of said second transistor being coupled to the anode of a diode and said first negative voltage supply, said diode having a cathode coupled through a resistor to said first negative voltage supply and being coupled to a fourth of said four inputs through a third coupling capacitor, the collectors of said first and second transistors being respectively coupled to ground through first and second clamping diodes, the collector of said first transistor being coupled to a first of said three outputs and to said first negative voltage supply, first, second, third and fourth voltage dividers connected between said first negative voltage supply and said second positive voltage supply, the base of said second transistor being coupled to a tap on said first voltage divider, a third transistor having a base, collector, and an emitter, the base of said third transistor being coupled to the collector of said second transistor and to a second positive voltage supply, the emitter of said third transistor being coupled to a third of said four inputs, the collector of said third transistor being coupled to said first negative voltage supply, fourth and fifth transistor each having a base, collector, and emitter, a fourth coupling capacitor connected between the base of said fourth transistor and the collector of said fifth transistor, a fifth coupling capacitor connected between the base of said fifth transistor and the collector of said fourth transistor, the emitters of said fourth and fifth transistors being coupled through a common connection to said first positive voltage supply, the base of said fourth transistor being coupled to a first tap on said second voltage divider, the collector of said fifth transistor being coupled to a second tap on said second voltage divider and to said second input, the collector of said fifth transistor being coupled to said second input, third and fourth clamping diodes respectively coupling the collectors of said fourth and fifth transistors to ground, diode coupling means coupling the emitter of said fourth transistor to said first and fourth inputs, and means directly coupling the emitter of said fourth transistor to the second output of said output stage, a sixth transistor having a base, collector and an emitter, the base of said sixth transistor being coupled through a resistor to the collector of said fifth transistor, the emitter of said sixth transistor being coupled to said second negative voltage supply, and the collector of said sixth transistor being coupled through a resistor to said second positive voltage supply and directly coupled to said third output.

5. The combination of claim 4 wherein said shift circuit comprises a circuit having two inputs and three outputs, an output gate having first and second transistors, each having a base, collector and emitter, means coupling the collector of said first transistor to the emitter of said second transistor, the emitter of said first transistor being coupled to ground, the base of said second transistor being coupled through a first resistor to ground, through a second resistor to a first positive voltage supply, and through a first coupling capacitor to said first input, the collector of said second transistor being coupled through a resistor to a first negative voltage supply, a first voltage divider connected between said first negative voltage supply and ground, the collector of said second transistor being coupled to a tap on said first voltage divider, third and fourth transistors, each having a base, collector and emitter, a second coupling capacitor connected between the base of said third transistor and the collector of said fourth transistor, a third coupling capacitor connected between the base of said fourth transistor and the collector of said third transistor, first and second clamping diodes respectively coupling the collectors of said third and fourth transistors to ground, means coupling the tap of said first voltage divider to the base of said third transistor, the emitters of said third and fourth transistors being coupled through a common connection to said first positive voltage supply, the collector of said fourth transistor being coupled to said first negative voltage supply, a second and third voltage divider connected between the first negative voltage supply and the second positive voltage supply, the collector of said third transistor being coupled to a first tap on said third voltage divider, the base of said fourth transistor being coupled to a second tap on said second voltage divider, a fifth transistor having a base, emitter and collector, the base of said fifth transistor being coupled to the collector of said fourth transistor, the collector of said fifth transistor being coupled to said first positive voltage supply, the emitter of said fifth transistor being coupled through a resistor to said first negative voltage supply and directly coupled to said first input, a sixth transistor having a base, emitter and collector, the emitter of said sixth transistor being coupled to ground, the base of said sixth transistor being coupled to said second input, means coupling the collector of said sixth transistor to said second positive voltage supply, seventh and eighth transistors each having a base, collector and emitter, a fourth coupling capacitor coupling the base of said seventh transistor to the collector of said eighth transistor, a fifth coupling capacitor coupling the base of said eighth transistor to the collector of said seventh transistor, the emitters of said seventh and eighth transistors being coupled through a common connection to said second negative voltage supply, third and fourth clamping diodes respectively coupling the collectors of said seventh and eighth transistors to ground, the collector of said eighth transistor being coupled to a tap on said third voltage divider, the base of said seventh transistor being coupled to a second tap on said second voltage divider, means coupling the collector of said sixth transistor to the collector of said seventh transistor, means coupling the base of said eighth transistor to said second positive voltage supply, a ninth transistor having a base, emitter and collector, means coupling the base of said ninth transistor to the collector of said seventh transistor and to said first negative voltage supply, means coupling the collector of said ninth transistor to said second positive voltage source and through a capacitor to ground, means coupling the emitter of said ninth transistor to said first negative voltage supply, a tenth transistor having a base, emitter and collector, the base of said tenth transistor being coupled to the emitter of said ninth transistor and to said first negative voltage supply, the emitter of said tenth transistor being coupled to ground, the collector of said tenth transistor being directly coupled to said second output, eleventh and twelfth transistors each having a base, emitter and collector, a sixth capacitor coupling the base of said eleventh transistor to the collector of said twelfth transistor, a seventh capacitor coupling the base of said twelfth transistor to the collector of said eleventh transistor, the emitters of said eleventh and twelfth transistors being coupled through a common connection to said first positive voltage supply, fifth and sixth clamping diodes respectively coupling the collectors of said eleventh and twelfth transistors to ground, means coupling the base of said eleventh transistor to the collector of said seventh transistor and to said first negative voltage supply, means coupling the collector and base of said twelfth transistor and the collector of said eleventh transistor to said first negative voltage supply, a thirteenth transistor having a base, collector and emitter, means coupling the base of said thirteenth transistor to the collector of said eleventh transistor, means coupling the collector of said thirteenth transistor through a resistor to said second positive voltage supply and through a capacitor to ground, means coupling the emitter of said thirteenth transistor to said first negative supply voltage and to said third output.

6. The combination of claim 5 wherein said summing and weighting network comprises a network having an output and a first and second input, first and second transistors, each having a base, a collector and an emitter, a source of direct current voltage having first, second and ground terminals, said first terminal having a voltage that is more positive than the voltage at said second terminal, a variable resistor having a first and second terminal, the first terminal of said variable resistor being coupled to the first terminal of said voltage source, each of said emitters being coupled respectively through a first and second resistor to the second terminal of said variable resistor, each of said bases being coupled through a common resistor to the second terminal of said voltage source, a first decoupling capacitor coupled between the second terminal of said variable resistor and said ground terminal, a second decoupling capacitor coupled between said bases and said ground terminals, a resistive ladder network having first, second and third terminals, said first terminal being coupled to said output and said second terminal being coupled to ground, first and second diodes having their anodes respectively coupled to the collectors of said first and second transistors, third and fourth diodes having their anodes coupled respectively to the collectors of said first and second transistors, said first and second diodes having their respective cathodes respectively coupled to said first and second inputs, said third diode having its cathode coupled to said first terminal of said resistor ladder network and said fourth diode having its anode coupled to the third terminal of said resistive ladder network.

References Cited in the file of this patent

UNITED STATES PATENTS

| | | |
|---|---|---|
| 2,611,807 | Lazzery | Sept. 23, 1952 |
| 2,637,763 | Palmer | May 5, 1953 |
| 2,791,764 | Gray et al. | May 7, 1957 |
| 2,796,314 | Bishop et al. | June 18, 1957 |
| 2,816,237 | Hageman | Dec. 10, 1957 |
| 2,817,481 | Beesley | Dec. 24, 1957 |
| 2,824,698 | Van Nice et al. | Feb. 25, 1958 |
| 2,828,482 | Schumann | Mar. 25, 1958 |
| 2,836,356 | Forrest et al. | May 27, 1958 |
| 2,837,662 | Ehret | June 3, 1958 |

OTHER REFERENCES

"Analog-to-Digital Conversion," M. L. Klein, Instruments and Automation, vol. 29, issue 5, May 1956, pp. 911–917.